Jan. 18, 1966 T. A. DEPREZ ETAL 3,229,585
TOOTH CUTTING MACHINE
Original Filed March 11, 1963 8 Sheets-Sheet 1

INVENTORS
THOMAS A. DEPREZ
WILLIAM G. BUCHANAN
EDWIN A. HEDIGER
BY Richard W. Treverton
ATTORNEY

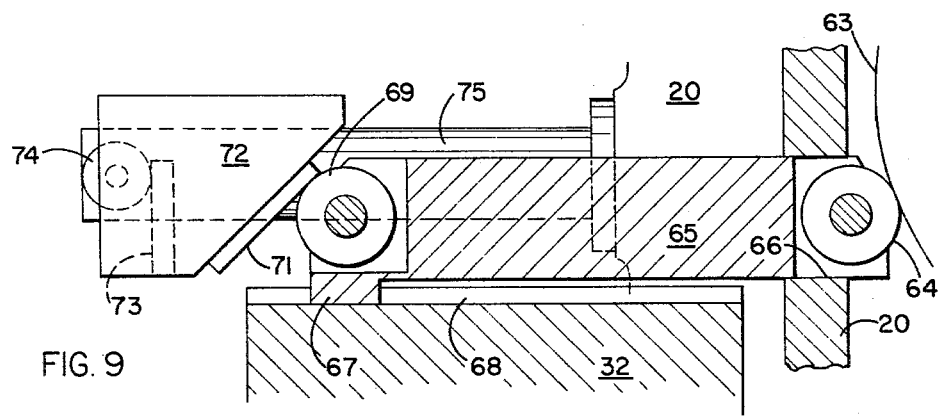
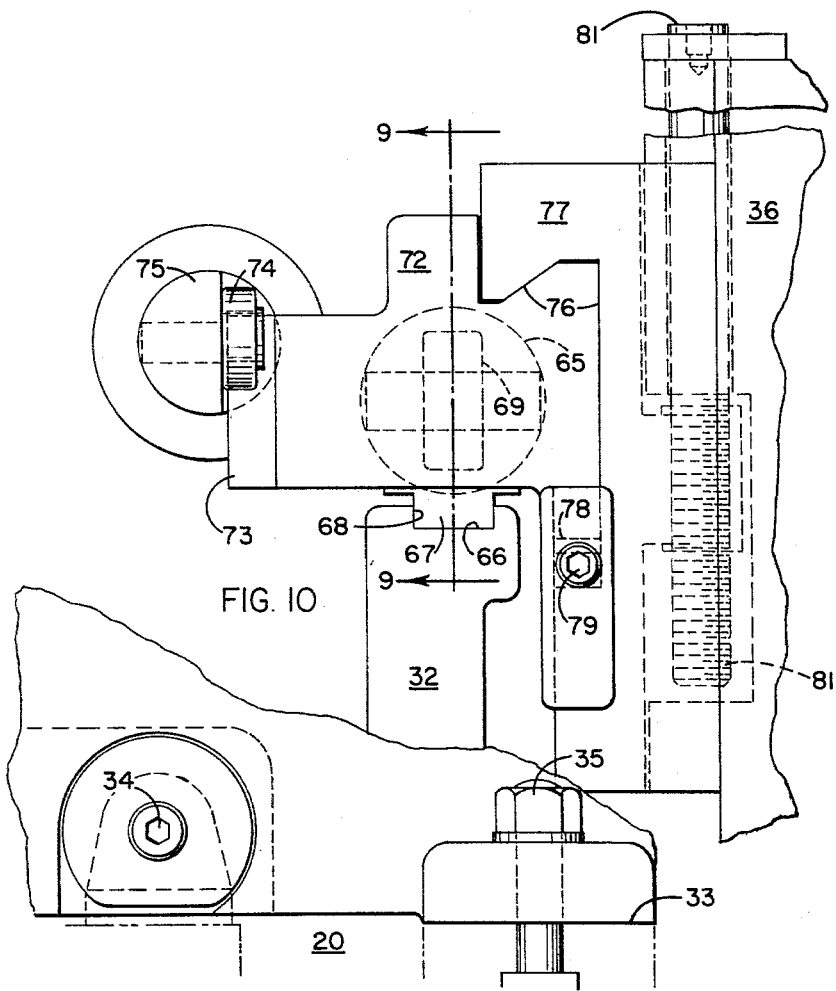

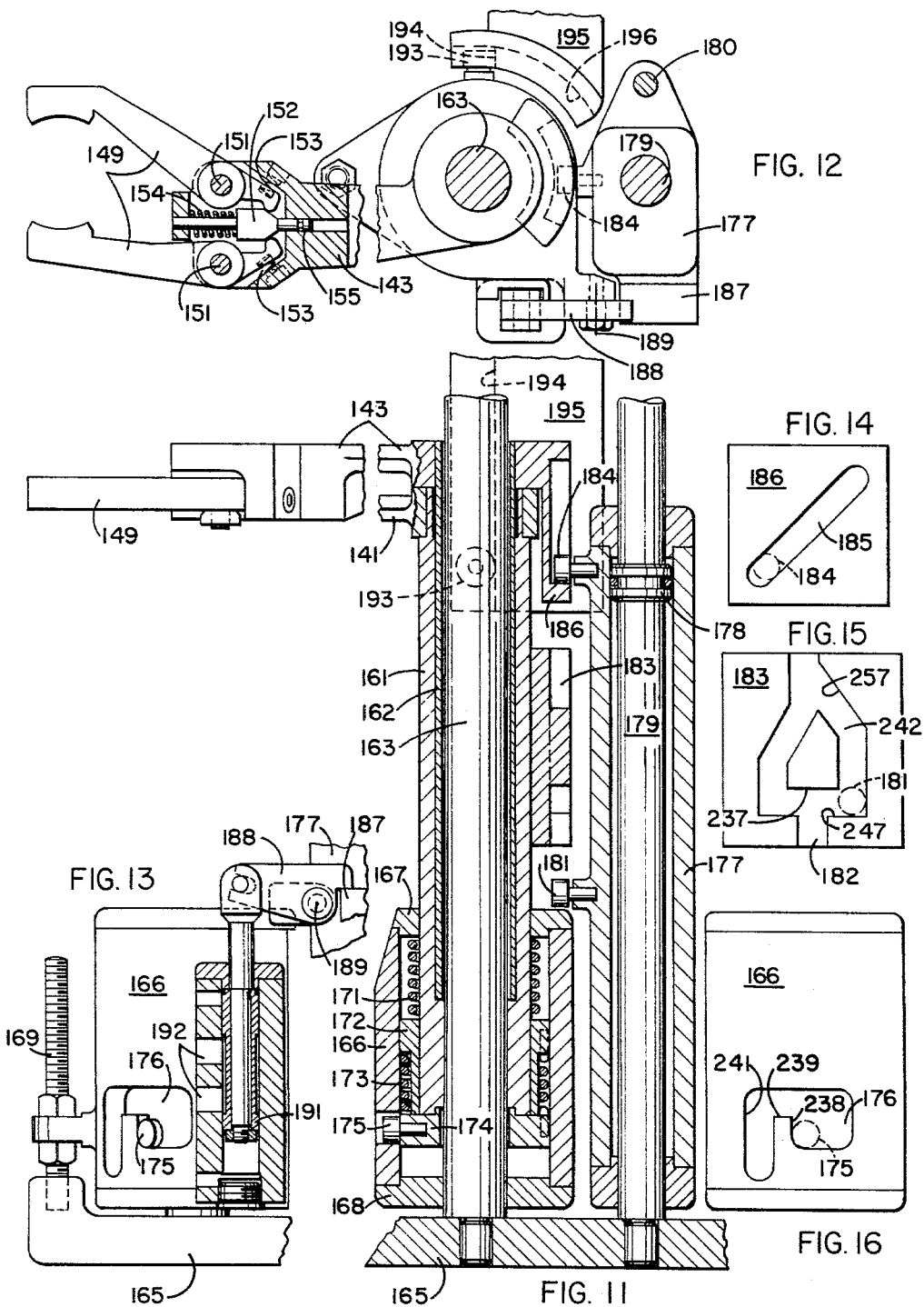

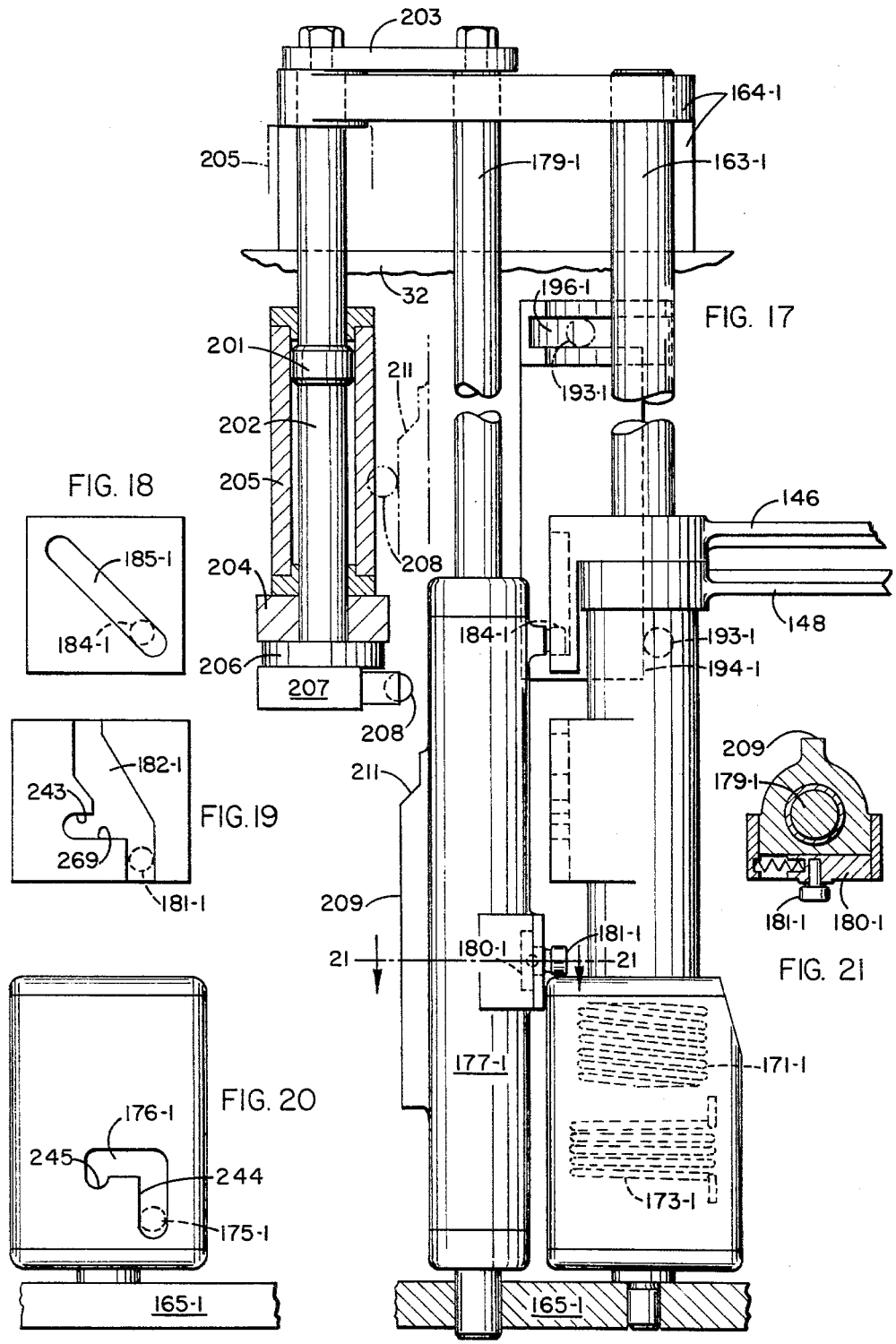

United States Patent Office 3,229,585
Patented Jan. 18, 1966

3,229,585
TOOTH CUTTING MACHINE
Thomas A. Deprez and William G. Buchanan, Rochester, and Edwin A. Hediger, Fairport, N.Y., assignors to The Gleason Works, Rochester, N.Y., a corporation of New York
Continuation of abandoned application Ser. No. 264,327, Mar. 11, 1963. This application Jan. 7, 1964, Ser. No. 337,121
24 Claims. (Cl. 90—9)

This application is a continuation of application Serial No. 264,327, filed March 11, 1963, and now abandoned.

The resent invention relates to a tooth cutting machine, particularly adapted for cutting straight bevel gears, by the method disclosed in E. Wildhaber Patent No. 2,267,181.

A primary object of the invention is such a machine of compact and rugged design, capable of cutting at high speed. In the preferred embodiment, two disc milling cutters are mounted on opposite ends of a spindle which rotates continuously while the machine is cutting. One cutter roughs out the tooth slots in a gear blank by a circular broaching operation, while the other cutter finish cuts the teeth of a rough cut gear. At each of the roughing and finishing stations the workpiece is indexed to bring a successive tooth space to cutting position each time a gap between the last and first blades of the rotating cutter comes abreast of the work. After all of the teeth have been cut the two work spindles are withdrawn, and, while the cutters rotate idly, a transfer mechanism unloads and reloads the work spindles. Then, as the first blades of the cutters approach cutting position, the work spindles are advanced to engage the work with the cutters.

By providing the rough and finish cutting blades on two different cutter heads, rather than on a single cutter head as has been usual heretofore, cutting time is reduced and the diameter of heads is reduced, leading to a more compact and rigid machine structure. More blades are accommodated on the finishing cutter, making feasible the sharpening of each finishing blade to cut on one side only of the tooth slot, which has been observed to produce an improved surface finish. The life of the finishing blades is also extended since they need not, as before, be sharpened each time the roughing blades are sharpened.

Relative reciprocation between the cutter and work, effected in time with cutter rotation, as disclosed in the afore-mentioned patent, is applied only in finish cutting, enabling the roughing work spindle to be clamped rigidly to the machine frame while cutting occurs, thereby reducing chatter and so improving both tooth finish and cutter life.

The foregoing and other objects and advantages of the invention will appear from the following description of the preferred embodiment shown in the accompanying drawings, wherein.

Figure 1:
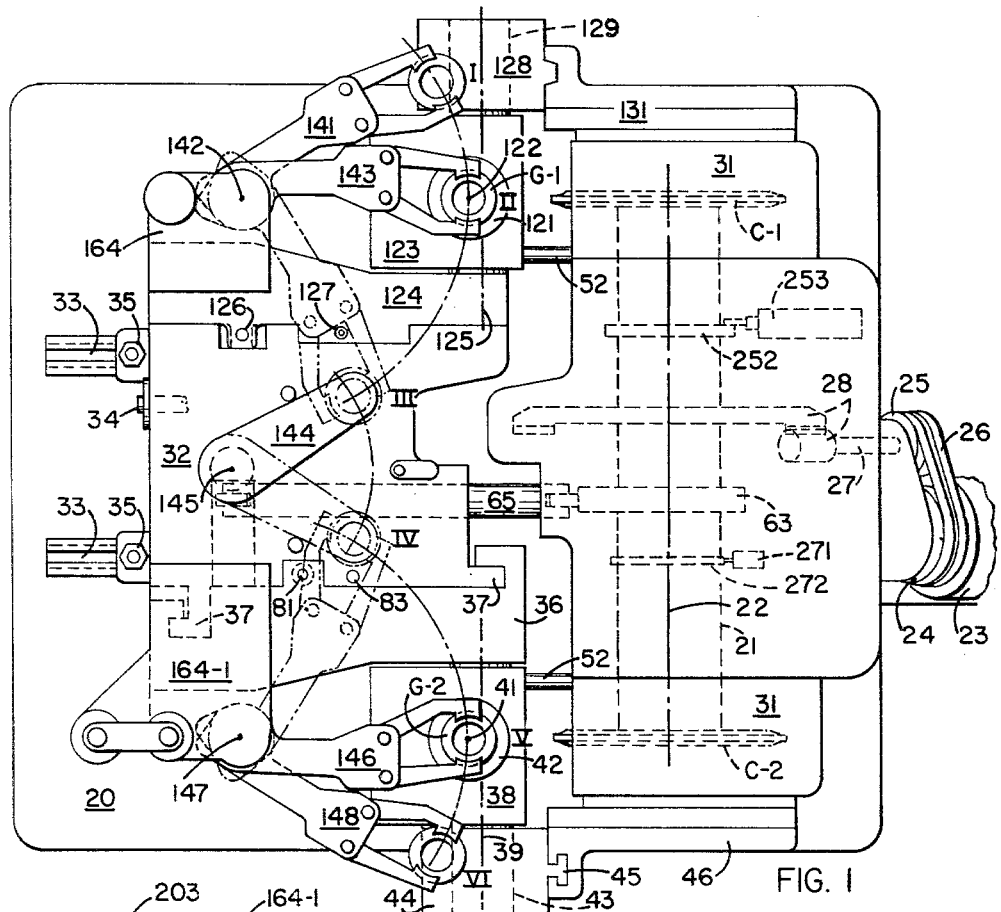
FIGS. 1 and 2 are respectively plan and side views of the machine.
Figure 2:
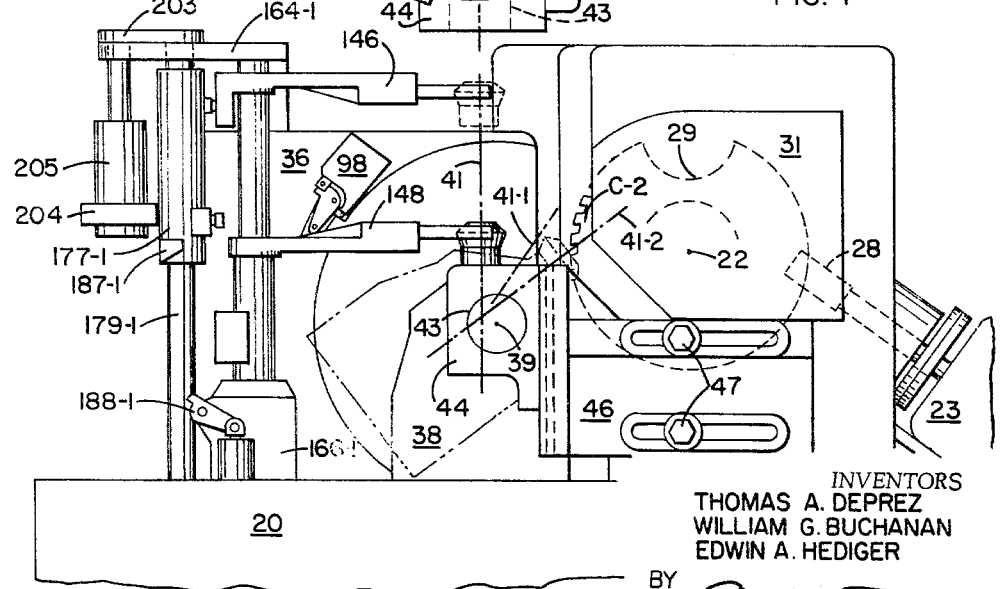
Figure 3:
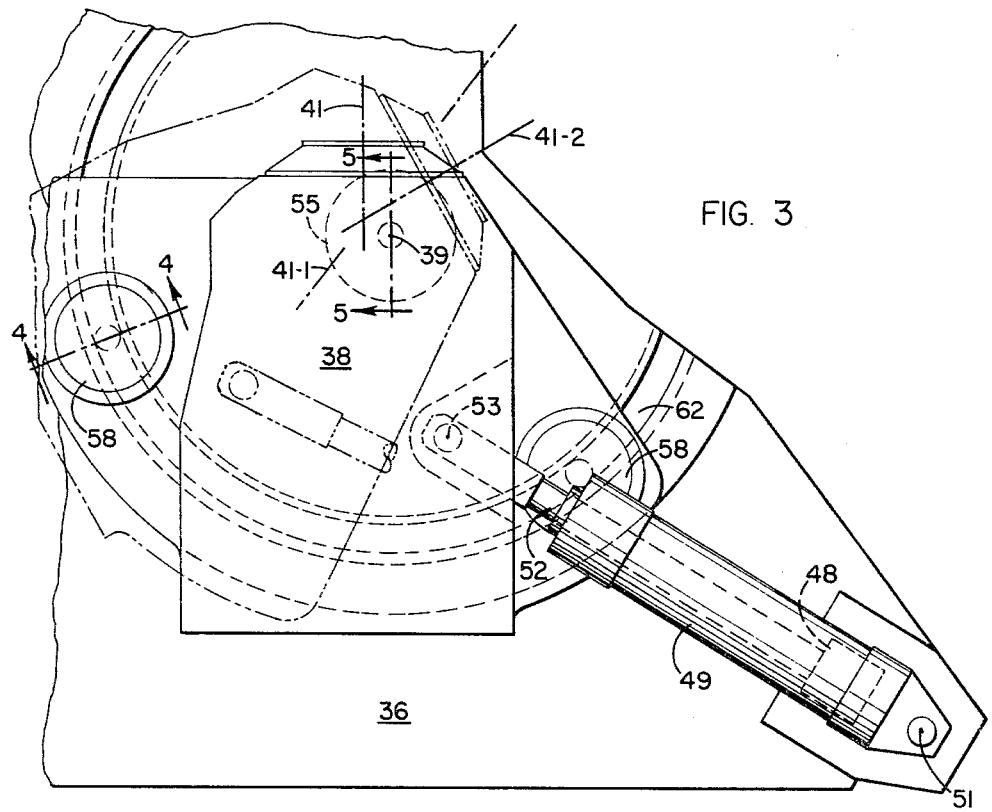
FIG. 3 is a side elevation of a mechanism for pivoting the finishing work head shown in FIG. 2 between loading and cutting positions.
Figure 4:
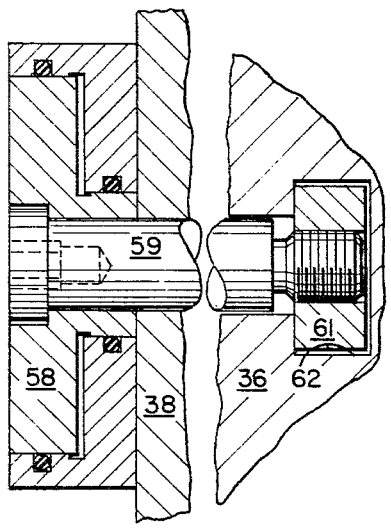
Figure 5:
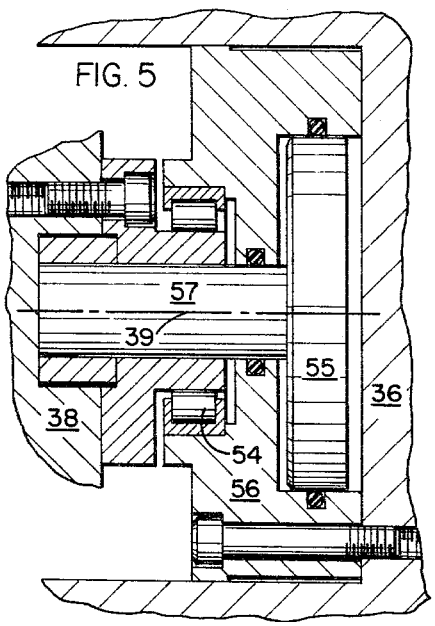
Figure 6:
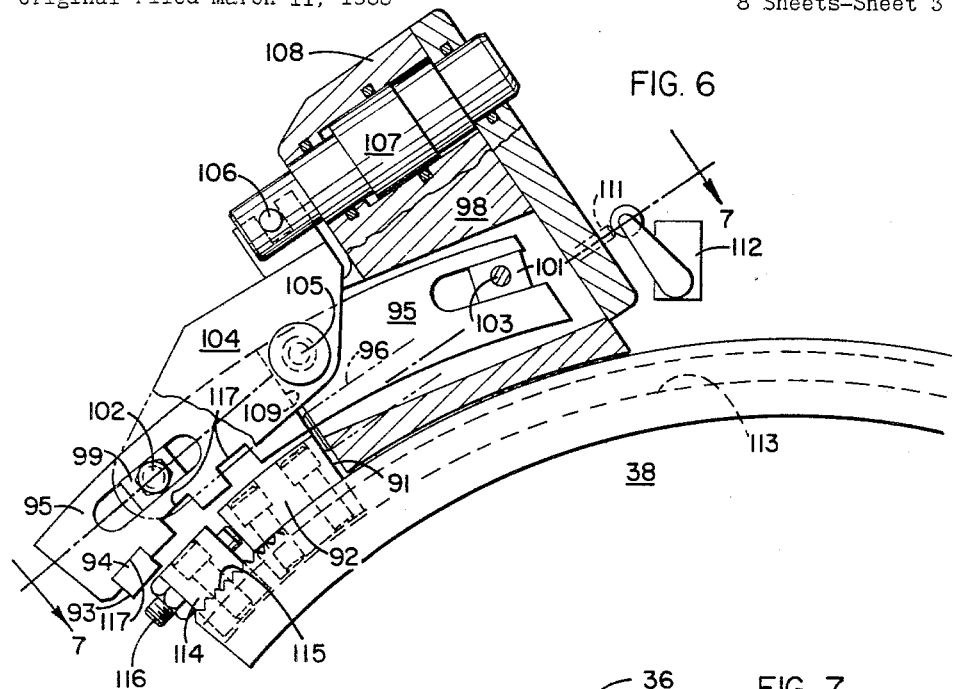
Figure 7:
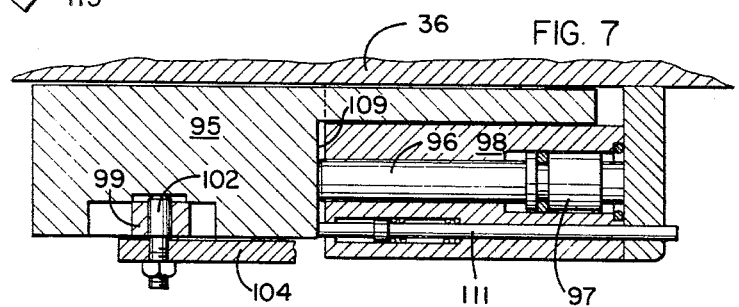
Figure 8:
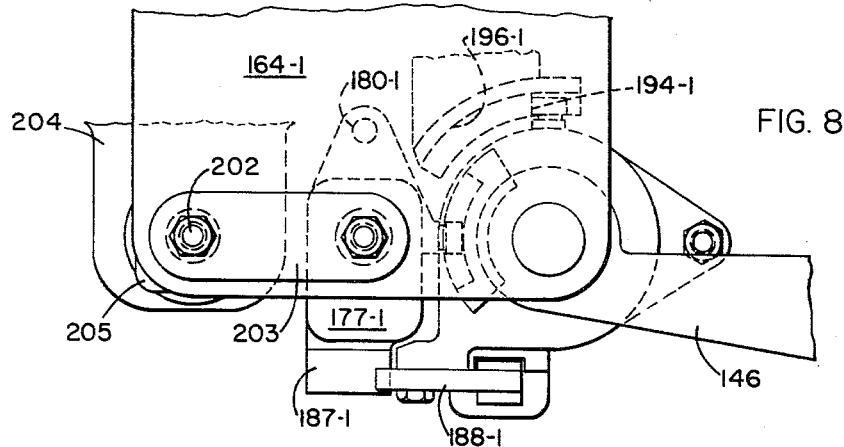
Figure 24:
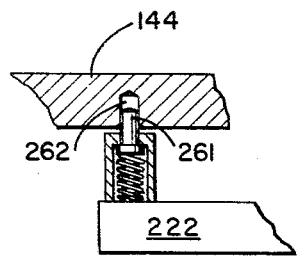
Figure 22:
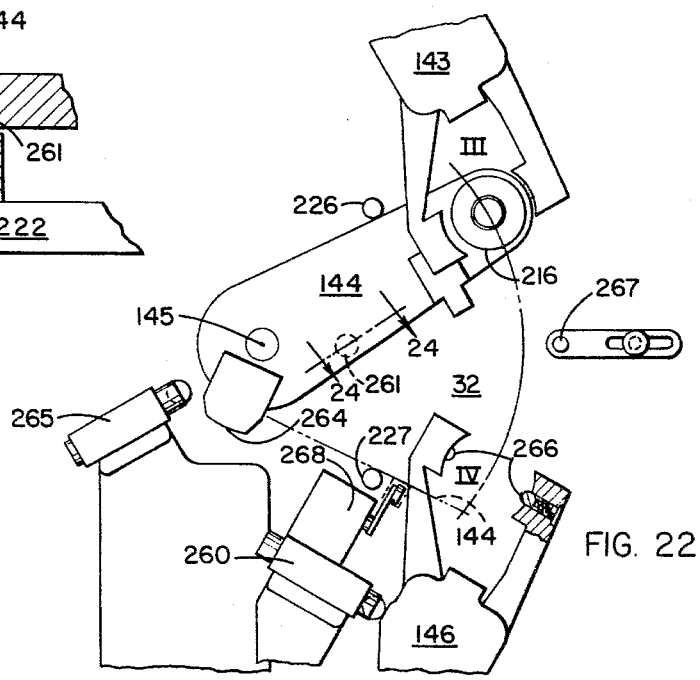
Figure 23:
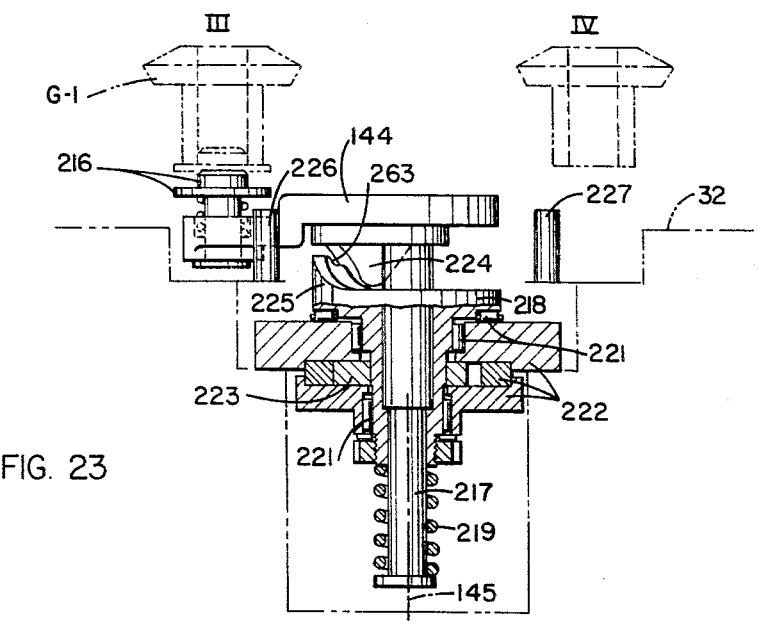
Figure 25:
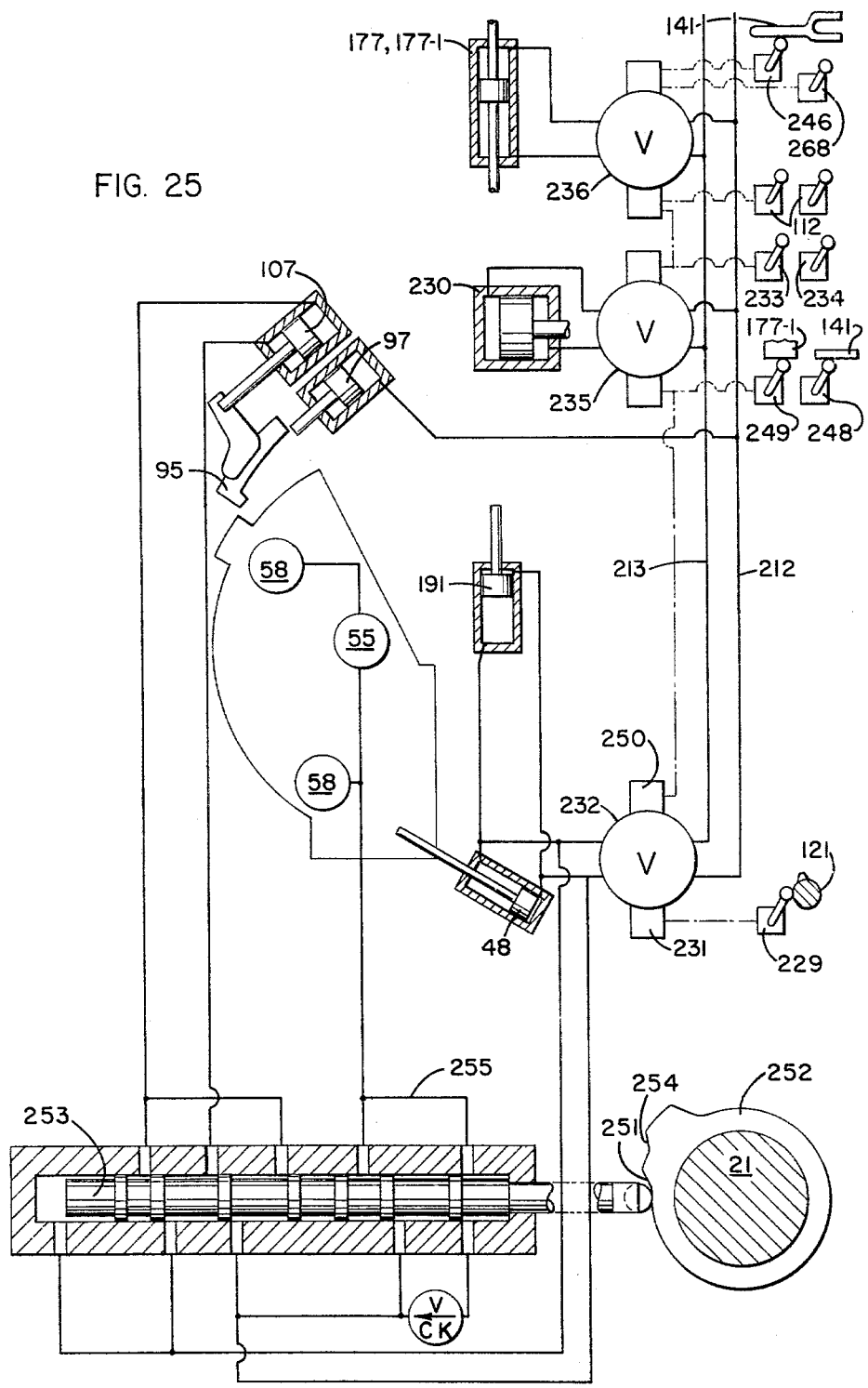

FIGS. 4 and 5 are sectional views respectively in planes 4—4 and 5—5 of FIG. 3;

FIG. 6 is a side view showing on a larger scale a work head latch mechanism which appears in FIG. 2;

FIG. 7 is a sectional view in the planes designated 7—7 in FIG. 6;

FIG. 8 is a detail plan view of the supporting and actuating mechanism for the finishing side work transfer arms appearing in FIGS. 1, 2 and 17;

FIG. 9 is a vertical sectional view, in plane 9—9 of FIG. 10, of an actuating mechanism for a slide which carries the finishing work head;

FIG. 10 is an end view of said actuating mechanism;

FIG. 11 is a vertical sectional view through the supporting and actuating mechanism for work transfer arms on the roughing side of the machine;

FIG. 12 is a plan view of the mechanism shown in FIG. 11;

FIG. 13 is a view, partly in vertical section, showing a stop device included in the mechanism of FIG. 11;

FIGS. 14 to 16 are detail views of cam structure illustrated in FIGS. 11 and 13;

FIGS. 17, 18, 19 and 20 are views similar to FIGS. 11 and 14 to 16 but illustrate the supporting and actuating mechanism for the work transfer arms on the finishing side of the machine;

FIG. 21 is a detail sectional view in plane 21—21 of FIG. 17;

FIG. 22 is a plan view on a larger scale of the mechanism shown in FIG. 2 for transferring work from a roughing-side transfer arm to a finishing-side transfer arm;

FIG. 23 is a vertical sectional view through the transfer mechanism of FIG. 22;

FIG. 24 as a detail vertical section in plane 24—24 of FIG. 22; and,

FIG. 25 is a diagram of portions of the hydraulic system of the machine, and of the electrical control means therefor.

On the machine frame 20 a cutter spindle 21 is journaled for rotation about horizontal axis 22, such rotation being effected by a motor 23 driving through pulleys 24 and 25 connected by belts 26, shaft 27 and high-reduction hypoid gearing 28. Multi-bladed disc milling cutters C–1 and C–2 are detachably secured to the opposite ends of the spindle, C–1 being a roughing cutter and C–2 a finishing cutter. Both have an indexing gap 29 between the last and first blades thereof, to enable tooth-to-tooth indexing of a workpiece, without cessation of cutter rotation, whenever the gap comes abreast of the workpiece. Cutter C–1 is of the broach type, successive tip cutting edges thereof, which are parallel to axis 22 and cut at the bottoms of the tooth slots, being at progressively greater radial distances from the axis 22, and the front or cutting faces of the blades are preferably sharpened with hook, i.e. with acute angled tip-cutting edges, to enable cutting by the tip edge and both side edges of each blade. Cutter C–2, for finish cutting at least the sides of tooth slots which have been rough cut by cutter C–1, preferably has its blades sharpened with side rake, to provide acute-angled side cutting edges, alternate blades being sharpened for cutting opposite sides of the slots. The cutting profiles of the blades are curved, preferably as disclosed in the aforementioned patent, in the embodiment thereof described in connection with FIGS. 1 to 19, the roughing blades there described being provided on cutter C–1 and the finishing blades on cutter C–2. A removable cover 31 extends over each cutter.

A work column 32 is movable horizontally on the frame along ways 33 by means of an adjusting screw 34, and is clamped to the frame by bolts 35. A slide 36 is gibbed to guide ways 37 on the column for vertical movement thereon, and supports a work head 38 for pivotal motion about a horizontal axis 39, parallel to cutter axis 22. Journaled in the work head for stepwise or indexing rotation about its axis 41 is a work spindle 42 on which a previously rough cut gear G–2 is chucked in an hydraulically actuated arbor. As shown, the spindle axis 41 lies in the mean plane of rotation of cutter C–2. By angular motion of the work head about axis 39, the work gear may be swung from an upright loading position shown in full lines in FIGS. 2 and 3, wherein axis 41 is vertical, to an inclined waiting position in which the gear is just clear of the cutter, with its axis in the position designated 41–1, and then to a further inclined cutting position, wherein it is engaged by the cutter, and its axis is in the position designated 41–2.

Rigid with the work head there is a trunnion 43 journaled on axis 39 in an outboard support 44. The latter has a tongue 45 vertically reciprocable in a T-slotted guideway in a plate 46 secured to the frame 20 by bolts 47. These bolts extend through horizontally elongated slots in the plate to permit horizontal adjustment corresponding to adjustment of column 32 along ways 33.

Pivotal motion of work head 38 about axis 39 is effected hydraulically by a piston 48, FIG. 3, arranged in a cylinder 49 pivoted at 51 to slide 36. The piston rod, 52, is pivoted at 53 to the work head. Piston 48 abuts the lower right end of the cylinder 49 to limit counterclockwise pivoting of the work head to the position wherein spindle axis 41 is vertical. Referring to FIGS. 3, 4 and 5, the work head is supported for this pivotal motion by a roller bearing 54, and, during cutting operation, is hydraulically clamped to the slide with the work spindle axis in position 41–2. One of the three clamps provided for this purpose comprise a piston 55 that is slidable in a cylinder 56 secured to the slide 36 and whose rod 57 extends along axis 39 and is anchored to the work head 38. The other two clamps comprise pistons 58 operating in cylinders secured to the work head and having piston rods 59 anchored to blocks 61 slidable in an arcuate T-slot 62 in the slide 36.

For performing the method of the afore-mentioned patent, this slide 36 is reciprocated in time with rotation of cutter C–2. The reciprocation is effected by a cam 63 which is secured to the cutter spindle 21 and acts against a follower roller 64, FIG. 9, carried by a rod 65. The latter is slidable horizontally in a bearing 66 in frame 20 and has a bearing key 67 slidable in a guide keyway 68 in the column 32. On the opposite end of the rod there is a roller 69 (see also FIG. 10) bearing upon an inclined plate 71 on a block 72 secured to slide 36, the arrangement being such that when the cam 63 moves the rod 65 to the left in FIGS. 1 and 9, the block 72 and slide 36 are raised, and that when the cam allows movement of the rod to the right the block and slide lower by gravity. The block has a vertical guide 73 engaging a roller 74 carried by a bar 75 that is secured to the part of frame 20 which houses the cutter spindle. The block 72 is adjustable along horizontal guide surfaces 76 of a member 77, FIG. 10, to accommodate adjustment of the column 32 along ways 33. After such adjustment the block is clamped to member 77 by a wedge 78 actuated by a screw 79. Member 77 is adjustable relative to the slide 36 by means of a screw 81, to thereby adjust the height of the slide and work head relative to block 72. Upon adjustment, member 77 is clamped to the slide by a wedge actuated by screw 83, FIG. 1.

The waiting and cutting positions of the work head 38, wherein the work spindle axis is respectively at 41–1 and 41–2, are determined by the stop mechanism shown in FIGS. 6 and 7. In axis position 41–1, the piston 48, pressing to the left in FIG. 3, holds surface 91 of a block 92 on the work head in abutment with surface 93 of block 94 of a latch 95. In the position of the parts in FIG. 6, corresponding to axis position 41–2, the latch has been lifted to allow piston 48 to pivot the work head far enough to bring surface 91 into abutment with the rod 96 of a piston 97 which has a small stroke in a cylinder chamber in a part 98 of vertical slide 36. Hydraulic pressure is constantly applied to the right end of this cylinder chamber and serves to soften the impact of stopping the work head in axis position 41–2.

Latch 95 is slidably supported by blocks 99 and 101 which are pivoted respectively by pins 102 and 103 to the slide 36 and to a lever 104 which is fulcrumed to the part 98 by a pin 105. The opposite end of the lever is pivoted by slot-and-pin connection 106 to a latch-actuating piston 107 which is reciprocable in a cylinder chamber 108 in part 98. Hydraulic pressure applied respectively to the left and right ends of this chamber results in motion of the piston to depress or lift the latch. When the latch is in its depressed position, its surface 109 abuts the piston rod 96, so that piston 97 also serves to soften the impact of stopping the work head in axis position 41–1. A spring-backed plunger 111 in part 98, is shifted to the right by abutment by surface 91 of block 92 to close a limit switch 112 supported by the slide 36 when axis position 41–2 is reached.

For adjusting the inclination of the work spindle axis in cutting position 41–2, the block 92 is screw-clamped to the work head in any position of adjustment along dovetail groove 113 in the work head 38. Coarse adjustment is made by screw-clamping an auxiliary block 114 in a selected position along the toothed surface 115 of the work head, and fine adjustment by means of a screw 116 threaded into the block. The angle between spindle axis positions 41–1 and 41–2 depends upon the tooth depth of the work gears, and is adjustable by securing the bock 94 in one or another of the spaced slots 117 in the latch.

Referring again to FIG. 1, the work gear to be rough cut, G–1, is supported by work spindle 121 journaled for indexing rotation about its axis 122 in a work head 123 which is substantially like but of opposite hand to the work head 38. The supporting and actuating mechanism for the work head 123 is substantially like that for work head 38, including the pivoting and clamping means shown in FIGS. 3, 4 and 5 and the latch means shown in FIGS. 6 and 7. However the work head 123 remains stationary during cutting and hence it has no mechanism corresponding to elements 63, 65, 72 for reciprocating it vertically. Accordingly the vertical slide 124, to which work head 123 is pivoted on axis 125, is screw-clamped to the column 32 after being adjusted to the desired position thereon. It is adjustable vertically on the column by a vertical screw 126, and horizontally, in the direction of ways 33, by an inclined adjusting screw 127. Similarly the outboard support 128, in which trunnion 129 of head 123 is journaled, is screw-clamped to plate 131 after being adjusted vertically thereon. Plate 131 is adjustable horizontally on the frame, similarly to plate 46.

The machine includes several work-holding arms for loading and unloading the work spindles at times when their axes 41 and 122 are vertical. Referring to FIG. 1, arm 141 is movable along and about vertical axis 142 to transfer a workpiece from a receiving station I to station II, on spindle 121, the feeding of the piece to station I being by any suitbale mechanism and not being a part of the present invention. Arm 143, above arm 141, is also movable along and about axis 142 to transfer the piece from station II to station III. An arm 144, movable along and about axis 145, receives the workpiece at station III and delivers it at station IV to arm 146. The latter, movable about and along axis 147, places the piece on spindle 42, at station V. Arm 148, beneath arm 146, transfers the piece from station V to station VI where it is released to a suitable chute or other transport means. Arms 141, 143, 146 and 148 are provided with pivoted work-gripping jaws, similarly constructed and actuated. Referring to FIG. 12, jaws 149 are pivoted to arm 143 at 151 and are held against a wedge 152 by springs 153, and a heavier spring 154 urges the wedge to the right, to close the jaws. They may be opened either by hydraulic pressure applied to the right face of a piston 155, to move the wedge to the left, or by a force applied to the jaws themselves sufficient to overcome the force of the spring.

Referring to FIGS. 12 to 16, arms 141 and 143 are respectively secured to co-axial tubes 161 and 162 that are slidable and rotatable on a vertical rod 163 supported by upper and lower flanges 164, FIG. 1, and 165 on slide 124. A housing comprising parts 166, 167 and 168 extends around rod 163 and is adjustable vertically by nuts threaded to a screw 169 anchored to flange 165, the screw also holding the housing against rotation. A compression spring 171 in the housing presses downwardly against a plunger 172 that is slidable but non-rotatable in the housing. A torsion spring 173 arranged to act between the plunger and a part 174 secured to the bottom of tube 161 to urge the tube and arm 141 clockwise in FIGS. 1 and 12, i.e. to move to the left in FIGS. 13 and 16 a roller 175 carried by part 174. The roller is engaged in a latch slot 176 in housing section 166.

An actuating cylinder 177 for arms 141 and 143 is movable vertically upon a stationary piston 178 whose rod 179 is secured to flanges 164 and 165 of slide 124. A guide rod 180, FIG. 12, similarly supported by slide 124, holds the cylinder 177 against rotation. The cylinder carries a roller 181 which is engageable in an open-ended slot 182 formed in a cam 183 secured to tube 161, and another roller 184 engaged in a closed helical slot 185 in a similar cam 186 secured to tube 162. A block 187 carried by a cylinder 177 is engageable with a stop lever 188 that is fulcrumed to housing 167–169 at 189 as shown in FIGS. 12 and 13. The stop lever is actuated by a piston 191 which also serves as a valve, for ports 192, to control the rate of application of hydraulic fluid to cylinder 177. In the elevated position of the piston-valve 191 shown in FIG. 13, the stop lever 188 is in the path of block 187 and the flow to cylinder 177 is unthrottled; but in its lowered position the flow is directed through a throttle valve (not shown) and the stop is swung clear of the path of block 187. In lower positions of arm 143, a roller 193 carried thereby is engageable with a vertical surface 194 of a guide 195 secured to vertical slide 124 for vertical adjustment thereon. In the upper limit position of the tube, the roller is disengaged from surface 194 and instead engages in a horizontal arcuate groove 196 in the guide.

The supporting and actuating mechanisms shown in FIGS. 8 and 17 to 20 for arms 146 and 148 are respectively like those for arms 143 and 141, but are of opposite hand, and the corresponding parts are designated by the same numerals with suffix "–1." One difference is that the latch and cam slots 176–1 and 182–1 are of different shape than slots 176 and 182. Another difference is that, as shown in FIGS. 17 and 21, roller 181–1 is supported by a spring-backed slide 180–1 movable transversely of cylinder 177–1, the spring urging the slide in a direction to move the roller 181–1 to the left in FIG. 19. Another difference is that the part 164–1 which supports the upper ends of rods 163–1 and 179–1 slidably engages these rods and is secured to column 32 instead of to slide 36. Also rod 179–1 is slidable in flange 165–1 of slide 36. Still another difference is that clamp means are provided to clamp the piston rod 179–1 (upon which vertical position of arm 146 depends) to the column 32 while work is being transferred from arm 144 to arm 146, and at other times to clamp it to the slide 36 for vertical reciprocation therewith.

The clamp means comprise a stationary piston 201, FIG. 17, whose rod 202 is connected by cross-bar 203 to piston rod 179–1 and extends slidably through a bore in a lug 204 on slide 36. A cylinder 205 is reciprocable on the piston, and in its uppermost position, shown in broken lines, clamps the cross-bar to the plate 164–1 rigid with column 32. In its lowermost position, shown in full lines, it clamps on lug 204 a flange 206 on the bottom of rod 202. The flange supports a reversing valve 207 whose spring-backed actuating stem has a roller 208 engageable with a cam track 209 on elevator cylinder 177–1. The valve controls application of hydraulic pressure to cylinder 205, the cam riser 211 reversing the valve to cause the cylinder 205 to rise to its upper limit position as the elevator cylinder 177–1 approaches its upper position and to descend to its lower limit position as the elevator cylinder departs from its upper position.

The arm 144, FIGS. 1 and 22 to 24, carries a spring-backed plunger 216 for engaging in the bore of work gear G–1, and is secured to a shaft 217 that is rotatable about and movable along axis 145 in a hub 218, being constantly urged to its downward limit position in the hub by a spring 219. The hub is rotatable on anti-friction bearings 221 in the stator 222 of an oscillating vane hydraulic motor whose vane piston 223 is keyed to the hub. On the arm 144 there is cam lobe 224 which is driven, by a cam lobe 225 on the hub, back and forth between limit positions in which the arm abuts stop pins 226 and 227 on column 32, these being respectively the positions wherein a workpiece on the arm is at station III and station IV.

During operation of the machine the cutters C–1, C–2, rotate continuously, making one revolution for the cutting of each tooth space of the workpiece. Also, depending upon the speed for which the work transfer mechanism is set to operate, the cutters make one or more revolutions during the reloading of the work spindles between the cutting of successive pieces. During cutting, the arm 141 waits with a fresh workpiece at station I; arm 143 waits at station II, with its jaws empty; arm 144 waits, empty, in its lowermost position at station III; arm 146 waits at station V, holding a workpiece previously rough cut by cutter C–1; and arm 148 waits, empty, also at station V. Upon indexing of the work spindles at the conclusion of cutting the following operations occur:

(A) Solenoid 231, FIG. 25, controlled by a switch 229 actuated by a cam lobe on spindle 121, causes valve 232 to reverse the connection of cylinder 49 to hydraulic pressure and return lines 212 and 213 respectively, to thereby cause piston 48 (and the corresponding piston associated with roughing work head 123) to swing the work heads about axes 39 and 125 to vertical position, placing the workpieces G–1 and G–2 in the jaws of arms 143 and 148. Piston 191 is elevated.

(B) Limit switches 233 and 234, FIG. 25, mounted on slides 36 and 124 are closed when the work heads reach this position. When both are closed a solenoid valve 235 reverses, this valve controlling hydraulic actuators 230 for the arbors in which the workpieces are held, and at this time acting to dechuck the work. These switches at this time also cause a solenoid valve 236 to reverse with a slight time delay to apply hydraulic pressure to elevator cylinders 177 and 177–1 which, due to the elevated position of piston 191, lift rapidly until stop blocks 187 and 187–1 abut stop levers 188 and 188–1. Referring to FIGS. 11 to 16, roller 184 acting in slot 185 lifts arm 143 to strip the workpiece from the arbor of spindle 121. The arm is held against rotation by the engagement of roller 193 with vertical guide surface 194.

(C) During the latter part of this vertical motion of cylinder 177, roller 181 abuts surface 237 of cam 183, thereby lifting arm 141 (tube 161). Roller 175 rises on surface 238 of latch slot 176 until it is above surface 239, whereupon spring 173 swings arm 141 clockwise from station I to station II, aligning the gear blank with axis 122, and closing a limit switch 246, FIG. 25. In this latter position, roller 175 bears against surface 241 and roller 181 is aligned with branch 242 of slot 182, whereupon spring 171 lowers the arm 141, placing the blank workpiece on the arbor of spindle 121. In this position arm 141 closes a limit switch 248, FIG. 25.

(C–1) Referring to FIGS. 17 to 21, simultaneously with (B) and (C) the elevator cylinder 177–1 lifts both arms 146 and 148 by reason of roller 184–1 engaging in inclined slot 185–1 (surface 194–1 holding the arm 146 against rotation) and roller 181–1 engaging against surface 243 of cam slot 182–1. Accordingly arm 148 strips the gear G–2 from the arbor of the spindle 42. Roller 175–1 rises to the top of the surface 244 of slot 176–1, whereupon torsion spring 173–1 swings arm 148 clockwise to unloading station VI, wherein the workpiece G–2 is released by the jaws of the arm. This motion of the arm places the roller 175–1 at the left side of slot 176–1 (in FIG. 20), where it is held in the depression 245 by spring 171–1, and roller 181–1 is held at the right side of slot 182–1 (in FIG. 19).

(D) Upon limit switch 246, FIG. 25, being closed by arm 141, the valve 236 controlling cylinders 177 and 177–1 is reversed. Lowering of cylinder 177 is prevented by roller 181 engaging surface 247 of slot 182, but cylinder 177–1 descends, roller 181–1 passing out of slot 182–1. Arm 146 loads onto the arbor of spindle 42 the rough cut gear it carries, and at the completion of this motion cylinder 177–1 closes limit switch 249. When switches 248 and 249 are both closed solenoid valve 235 is reversed to cause chucking the workpieces on both spindles by arbor actuators 230, and energizes a solenoid 250 of valve 232, which with a slight time delay reverses the pressure to pistons 48 and thus swings the work heads to the waiting position determined by latch block 94. Pistons 191 are lowered, rendering levers 188 and 188–1 ineffective as stops and throttling the elevator cylinders.

(E) When the indexing gaps 29 of the cutters next come abreast of the workpieces, surface 251 of a cam 252 on the cutter spindle, FIG. 25, actuates a valve 253 to reverse the application of pressure to latch piston 107, thereby lifting latch 95 and so allowing the pistons 48 to swing the work heads on into cutting position. Before cutting commences, surface 254 of cam 252 effects further actuation of valve 253 to apply pressure to clamp pistons 55 and 58. Pressure applied through line 255 maintains the valve in this position until valve 232 is reversed after cutting is completed.

(F) When the work heads 38 and 123 reach cutting position, so that the limit switches 112 of both are closed, valve 236 reverses, causing the elevator cylinders to rise at low speed, piston 191, FIG. 18, now having lowered and stop lever 188 elevated. Rollers 184 and 184–1 lift the upper arms 143 and 146 respectively until rollers 193 and 193–1 enter into horizontal guideways 196 and 196–1 whereupon the helical form of cam shots 185 and 185–1 causes the arms to be swung respectively clockwise and counterclockwise to stations III and IV. The lift cylinders are so throttled that arm 146 reaches station IV before arm 143 reaches station III. As cylinder 177–1 rises, valve 207, FIG. 17, acts as before explained to unclamp the rod 179–1 from the vertical slide 36 and clamp it to the column 32 so that as the arm 146 swings to and from station IV it does not have imparted to it the reciprocating motion of the slide. Roller 181 by engaging inclined portion 257 of slot 182, FIG. 15, first lifts arm 141 to move roller 175 to the upper part of surface 241, FIG. 16, and then swings the arm counterclockwise to station I to there receive a fresh workpiece. This swinging action moves the roller 175 to the right in FIG. 16 until it passes surface 238, whereupon spring 171 moves the arm downwardly, latching the roller in the right portion of slot 176. Similarly roller 181–1 acting in slot 182–1, FIG. 19, causes arm 148 to rise and swing, counterclockwise, to station V, and roller 175–1 to be latched in the right (in FIG. 20) portion of slot 176–1.

(G) Referring to FIG. 22, when arm 146 reaches station IV it opens a valve 260 which reverses the application of hydraulic pressure to vane motor 222, 223, driving the hub 218 clockwise. A spring-backed pin 261 slidable in a cylinder on vane motor stator 222 is engaged in a bore 262 in arm 144 and at first holds the arm against rotation, so that lobe 225 rides under lobe 224 and lifts the arm, causing plunger 216 to engage in the bore of workpiece G–1 held by arm 143. Upon being lifted free of the pin 261 the arm 144 is driven clockwise by the tip portion 263 of lobe 225, lobe 224 resting on a shelf of lobe 225 adjacent said tip portion. A cam 264 on arm 144 actuates a valve 265 to open the jaws of arms 146 and 148 respectively to receive and to release a workpiece. As shown the jaws of arm 146 has spring-backed stock-dividing fingers 266 for engagement in the tooth spaces of the workpiece. A tooth-space-engaging pin 267 is adjustable on the column, this pin being so arranged in the path of the workpiece being carried by arm 144 as to rotate it on plunger 216 to bring its tooth spaces into register with jaw fingers 266 of arm 146. As the piece enters these jaws, cam 264 disengages valve 265, causing the jaws of arms 146 and 148 to close. In this position the arm 144 abuts stop 227 and, upon continuing motion of hub 218, the tip 263 of cam lobe 225 passes beneath cam lobe 224 and the arm 144 thereupon lowers, disengaging plunger 216 from the workpiece and closing a limit switch 268.

(H) Closing of switch 268 reverses valve 236, causing cylinders 177 and 177–1 to lower and thereby swing arms 143 and 146 respectively to stations II and V. Then, due to helical cam slots 185 and 185–1, the arms descend. As arm 146 moves away from valve 260, the latter reverses the vane motor 222, 223, causing the return swing of arm 144 to station III. As this arm is now at a lower level, cam 264 passes idly beneath valve 265. The return swing is arrested by pin 226, the lobe 225 raising and then passing beneath lobe 224, and, upon the ensuing lowering of arm 144, pin 261 enters bore 262. During the descent of cylinder 177, roller 181 in passing through cam 183 follows the left side (in FIG. 15) of divided slot 182, the resulting angular motion of roller 175 being accommodated by the width of the right side (in FIG. 16) of latch slot 176. During the descent of cylinder 177–1 cam track 209 releases valve 207, causing cylinder 205 to clamp lift piston rod 179–1 to vertical slide 36. Cylinder 177–1 is arrested by engagement of roller 181–1 with surface 269 of cam slot 182–1, FIG. 19.

(I) The work transfer cycle is now completed and ready for repetition upon the conclusion of cutting of the two workpieces now on spindles 42 and 121. One tooth space of each workpiece is cut during each revolution of the cutter, indexing of each work spindle by a suitable indexing mechanism within the work heads occurring each time the gaps 29 come abreast of the work. The indexing mechanisms, which preferably are as disclosed in application Serial No. 264,155, filed on Mar. 11, 1963 by E. A. Hediger, are so controlled by a switch 271, FIG. 1, operated by a cam 272 on the cutter spindle, that indexing action of both work spindles occurs each time the switch is closed.

Only the valve, 265, for operating the jaws of arms 146 and 148 has been illustrated, but it will be understood that where the design of the workpieces requires automatic operation of the jaws of arms 141 and 143, suitable control valves for them may be provided.

It will also be understood that the foregoing disclosure is made by way of illustration and example of the preferred embodiment of the inventive principles involved, and that various modifications and improvements may be made in the machine without departing from the invention or from the scope of the appended claims.

What we claim is:

1. A gear cutting machine comprising a frame, a cutter spindle rotatable in the frame and adapted to support disc-shaped roughing and finishing cutters on the opposite ends thereof, the frame supporting a pair of work heads each of which journals a work spindle, with the axes of the spindles lying respectively in the median planes of rotation of said cutters, means for indexing the work spindles once for each revolution of the cutters, and means for moving the work head related to the finishing cutter back and forth, substantially in the direction of the root of the tooth space being finish cut, once for each revolution of the cutters.

2. A machine according to claim 1 in which the last-mentioned means are driven by the cutter spindle.

3. A machine according to claim 1 in which the last-mentioned means comprise a cam on the cutter spindle, a follower for said cam reciprocable upon the frame, and an inclined shoe engaged by the follower and movable with the finishing work head.

4. A gear cutting machine comprising a frame, a horizontal cutter spindle rotatable in the frame and adapted to support disc-shaped roughing and finishing cutters on the opposite ends thereof, a column adjustable horizontally on the frame perpendicularly to the axis of the cutter spindle, roughing and finishing work heads supported by the column, each of said work heads journaling a work spindle, with the axes of the spindles in the respective median planes of rotation of the cutters, a member adjustable vertically and horizontally on the column perpendicularly to the cutter axis and supporting the roughing work head for motion thereon to advance and withdraw a workpiece on the work spindle thereof relative to the roughing cutter, a slide supported for reciprocation vertically on the column and supporting the finishing work head for motion thereon to advance and withdraw a workpiece on the work spindle thereof relative to the finishing cutter, means for effecting such workpiece advance and withdrawal motions of the work heads, and means for effecting said reciprocation of the slide in time with rotation of the cutter spindle.

5. A machine according to claim 4 in which said means for effecting reciprocation comprises a member reciprocable vertically and a cam on the cutter spindle for effecting such reciprocation, the last-mentioned member being supported by the frame for such reciprocation and being adjustable relative to said slide vertically and also horizontally in the same direction in which said column is adjustable on the frame.

6. A gear cutting machine comprising a frame, a horizontal cutter spindle rotatable in the frame and adapted to support disc-shaped roughing and finishing cutters on the opposite ends thereof, a column adjustable horizontally on the frame perpendicularly to the axis of said cutter spindle, roughing and finishing work heads supported by the column, each of said work heads journaling a work spindle, with the axes of the spindles in the respective median planes of rotation of the cutters, a member supporting the roughing work head on the column for pivotal motion about an axis parallel to the cutter spindle axis, said member being adjustable vertically and horizontally on the column perpendicularly to the cutter spindle axis, a slide supported for reciprocation vertically on the column and pivotally supporting the finishing work head for pivotal motion also about an axis parallel to the cutter spindle axis, means for effecting such pivotal motion of the work heads to advance and withdraw work on the spindles relative to the cutters, and means for reciprocating the slide in time with rotation of the cutter spindle.

7. A tooth cutting machine comprising a cutter spindle adapted to support a pair of axially spaced milling cutters, a pair of work spindles adapted to support workpieces in engagement with the respective cutters, said work spindles being perpendicular to the cutter spindle and supported for motion relative to the latter between workpiece loading and cutting positions, means for effecting such motion, and transfer means adapted to carry workpieces from one to the other of said work spindles, said transfer means moving workpieces axially onto and from said spindles when the latter are in loading position.

8. A machine according ot claim 7 in which each of said work spindles is journaled in a work head which is pivoted about an axis parallel to the cutter spindle for said motion between loading and cutting positions.

9. A machine according to claim 7 in which each cutter has an indexing gap and said means for effecting the motion between loading and cutting positions are coordinated with cutter rotation to effect movement of the work spindles into cutting position as said gaps come abreast of the work.

10. A tooth cutting machine comprising a milling cutter having an indexing gap between the last and first blades thereof, a work spindle perpendicular to the cutter rotation axis and means for pivoting said work spindle back and forth about an axis parallel to the rotation axis of the cutter into and out of cutting position, said means being coordinated with cutter rotation to effect the motion into cutting position as said gap comes abreast of a workpiece on the work spindle.

11. A machine according to claim 10 in which said means includes an hydraulic actuator for pivoting the work spindle between cutting position and a loading position, a latch for arresting motion of the work spindle from loading position toward cutting position, and means coordinated with cutter rotation for releasing said latch as said gap comes abreast of a workpiece on the spindle, to thereby enable the actuator to complete the motion of the work spindle to cutting position.

12. A tooth cutting machine comprising a pair of spindles for supporting workpieces in engagement with tooth cutting tools for roughing and finishing respectively, said spindles being journaled in respective work heads pivoted on axes perpendicular to the spindle axes for angular motion between (a) a loading position wherein the spindles are parallel and the workpieces thereon are clear of the cutting tools, and (b) a cutting position wherein the workpieces engage the tools, actuating means for effecting such angular motion, and workpiece handling means coordinated with said actuating means to load and unload said spindles in said loading position thereof and being adapted to carry rough cut workpieces unloaded from the roughing spindle to the finishing spindle.

13. A machine according to claim 12, for conical gears and the like, in which there are means for adjusting the angle of the pivotal motion of the work heads in accordance with the cone angles of the workpieces.

14. A tooth cutting machine comprising a frame, a cutter spindle on the frame adapted to support two axially spaced milling cutters, a pair of work spindles having their axes disposed in the mid-planes of rotation of the respective cutters and journaled for indexing rotation in work heads supported on the frame, only one of said heads being supported on the frame on a slide reciprocable perpendicularly to the cutter spindle axis, to thereby reciprocate a workpiece on the related work spindle tangentially of the related cutter, and means including a cam on said cutter spindle for effecting one such reciprocation of the slide for each revolution of the cutters.

15. A tooth cutting machine comprising a frame, a cutter spindle on the frame adapted to support two axially spaced milling cutters, a pair of work spindles having their axes disposed in the mid-planes of rotation of the respective cutters and journaled for indexing rotation in work heads supported by the frame for pivotal motion between cutting position and loading position about pivot axes parallel to the cutter spindle, one of said work heads being supported by the frame on a slide reciprocable in a direction parallel to the axes of the work spindles when in loading position, to thereby reciprocate a workpiece on the slide-carried spindle tangentially of the related cutter, and means for effecting one such reciprocation of the slide for each revolution of the cutter spindle.

16. A machine according to claim 15 having means to transfer workpieces from one to the other of said work spindles, said transfer means including an arm for loading a workpiece on the spindle of the work head carried by said slide, said arm being movable about and along an axis that is parallel to the cutter spindle axes when the latter are in loading position, an actuator for said arm, and means for alternately clamping said actuator to said frame and to said slide.

17. A tooth cutting machine comprising a frame supporting a pair of work heads each of which journals a work spindle for indexing rotation, the support for one of said work heads comprising a slide reciprocable relative to the frame during tooth cutting operation, means for effecting such reciprocation in the direction of the axes of both spindles when in loading position, work transfer means comprising a first arm movable along and about an axis extending in said direction, for removing a workpiece from one spindle and carrying it toward the other spindle, a second arm movable about and along another axis extending in said direction, for carrying such workpiece into alignment with the other spindle and placing it thereon, an intermediate arm movable about still another axis extending in said direction for transferring such workpiece from the first arm to the second arm, coordinated actuators for said arms, and means for clamping the actuator for said second arm alternately to said slide and to the frame, respectively when said second arm is receiving a workpiece from the intermediate arm and when it is placing such workpiece on said other spindle.

18. A tooth cutting machine comprising a frame supporting a roughing work head and a finishing work head each of which journals a work spindle for indexing rotation, the support for the finishing work head comprising a slide and means for receiprocating it relative to the frame during tooth cutting operation, such reciprocation being in the direction of the axes of both spindles when in loading position, work transfer means comprising a first member movable in said direction for removing a workpiece from the roughing spindle, a second member movable in said direction for placing a workpiece on the finishing spindle, an intermediate member movable perpendicularly to said direction to transfer a workpiece from said first member to said second member, and coordinated actuators for said members including means for holding said second member against motion relative to the frame in said direction while the second member is receiving a workpiece from said intermediate member and for causing said second member to reciprocate in unison with said slide while it engages a workpiece on the finishing spindle.

19. A machine according to claim 18 in which said work transfer means further comprises a loader member and an unloader member, and actuators therefor coordinated with the first-mentioned actuators, respectively for loading workpieces on the roughing spindle and unloading workpieces from the finishing spindle, said actuators being coordinated to cause said unloader member to remove a workpiece from the finishing spindle substantially simultaneously with removal of a workpiece from the roughing spindle by said first member, and said loader member to place a workpiece on the roughing spindle substantially simultaneously with the placing of a workpiece on the finishing spindle by said second member.

20. A tooth cutting machine comprising a frame supporting roughing and finishing work heads each of which journals a work spindle with its axis substantially upright for loading and unloading, the spindles being adapted to support workpieces on the upper ends thereof, upper and lower work transfer arms adjacent the roughing work head movable relative to the frame about and along a first swing axis parallel to the work spindle axes in loading position, upper and lower work transfer arms adjacent the finishing work head movable relative to the frame about and along a second swing axis parallel to the work spindle axes in loading position, an intermediate transfer arm movable relative to the frame about a third swing axis also parallel to the work spindle axes in loading position, and coordinated actuating means for actuating said arms to cause (a) the upper arm adjacent the roughing work head to move along and about said first axis to remove a workpiece from the roughing spindle and carry it to said intermediate arm, (b) the lower arm adjacent the roughing work head to move about and along said first axis to carry a workpiece from a receiving station to the roughing spindle and place it thereon, (c) the lower arm adjacent the finishing work head to move along and about said second axis to remove a workpiece from the finishing spindle and carry it to a discharge station, (d) the upper arm adjacent the finishing work head to move about and along said second axis to carry a workpiece from the intermediate arm to the finishing spindle and place it thereon, and (e) the intermediate arm to move about said third axis to carry a workpiece from said upper arm adjacent the roughing work head to said upper arm adjacent the finishing work head.

21. A machine according to claim 20 in which said intermediate arms is also movable along said third axis, and the actuating means therefor is adapted to lift said intermediate arm to engage a workpiece held by said upper arm adjacent the roughing work head before moving about said third axis to carry the workpiece to the other upper arm.

22. A machine according to claim 21 in which the actuating means for said intermediate arm comprises a fluid pressure operable actuator movable angularly back and forth about said third axis through a greater angle than said arm, cooperating upwardly and downwardly projecting cam lobes respectively on said actuator and said arm, the lobe on the actuator driving the lobe on the arm back and forth and passing beneath the lobe on the arm at the end of each back and forth stroke, and a vertically reciprocable spring-backed plunger acting between the frame and said arm to hold the latter, when lowered, in one angular limit position thereof, and one of said lobes having a shelf on one side thereof on which the other lobe may rest in an elevated position of the arm wherein said plunger is disengaged, to cause elevation of the arm before its angular motion in one direction is begun.

23. A machine according to claim 20 in which an actuating means for each upper and lower arm pair comprises a torsion spring to move the lower arm about the swing axis thereof, a compression spring to urge said lower arm downwardly, a fluid pressure actuated element movable parallel to said axis, a cam on each arm and a follower on said element engageable with each such cam for effecting motion of the arms along and about said axis by motion of said element, and a roller on each of said arms engaging guide surfaces on elements supported by the frame, for coordinating the angular and axial motions of the arms effected by said cams and said springs.

24. A tooth cutting machine comprising a frame supporting a work spindle substantially upright for loading and unloading workpieces on the upper end thereof, upper and lower work transfer arms movable relative to the frame about and along an axis parallel to the spindle, spring means effective between the frame and the lower arm for urging the latter angularly and downwardly about and along said axis, a fluid pressure actuated element reciprocable relative to the frame in a direction parallel to said axis, a cam on each arm and followers for said cams on said element, and followers on each of said arms engaging guide surfaces of parts supported by the frame, for coordinating the angular and axial motions of the arms effected by said cams and said spring means in a manner to cause one arm to carry a workpiece from a receiving station into alignment with the spindle and then move it axially onto the spindle, and the other arm to subsequently remove the workpiece axially from said spindle and carry it to a discharge station.

References Cited by the Applicant

UNITED STATES PATENTS

| | | |
|---|---|---|
| 678,385 | 7/1901 | Ferris. |
| 1,730,637 | 10/1929 | White. |
| 2,585,809 | 2/1952 | Male. |
| 2,589,475 | 3/1952 | Carlsen et al. |
| 2,773,426 | 12/1956 | Fowler et al. |
| 2,874,853 | 2/1959 | Dammert. |

WILLIAM W. DYER, JR., *Primary Examiner.*